(12) United States Patent
Czajkowski et al.

(10) Patent No.: US 10,507,410 B2
(45) Date of Patent: Dec. 17, 2019

(54) AIR-OIL SEPARATION APPARATUS

(71) Applicant: PRATT & WHITNEY CANADA CORP., Longueuil (CA)

(72) Inventors: Marcin Czajkowski, Medynia Lancucka (PL); Sebastien Bergeron, Chambly (CA); Filip Adam Pulter, Rzeszow (PL); Johnny Vinski, Chateauguay (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 126 days.

(21) Appl. No.: 15/400,560

(22) Filed: Jan. 6, 2017

(65) Prior Publication Data

US 2018/0193770 A1 Jul. 12, 2018

(51) Int. Cl.
| | |
|---|---|
| *B01D 45/06* | (2006.01) |
| *B01D 45/08* | (2006.01) |
| *B01D 46/12* | (2006.01) |
| *B01D 45/04* | (2006.01) |
| *B01D 50/00* | (2006.01) |
| *F01D 25/18* | (2006.01) |
| *B01D 19/00* | (2006.01) |

(52) U.S. Cl.
CPC ..... *B01D 19/0052* (2013.01); *B01D 19/0047* (2013.01); *F01D 25/18* (2013.01)

(58) Field of Classification Search
CPC ........ B01D 45/06; B01D 45/08; B01D 46/12; B01D 45/04; B01D 50/00; B01D 19/00; B01D 19/0047; B01D 19/0052; F02B 25/06; F01D 25/18

USPC ......... 55/308, 318, 434, 413, 327, 394, 423, 55/424, 444, 306; 123/573; 96/209
See application file for complete search history.

(56) References Cited

U.S. PATENT DOCUMENTS

| | | | | |
|---|---|---|---|---|
| 4,437,867 | A * | 3/1984 | Lerner ................... | B01D 46/12 55/308 |
| 6,290,738 | B1 * | 9/2001 | Holm ..................... | B01D 45/08 55/309 |
| 7,435,290 | B2 | 10/2008 | Lane et al. | |
| 7,867,310 | B2 * | 1/2011 | Baten ..................... | B01D 45/16 55/385.1 |
| 8,202,339 | B2 * | 6/2012 | Janakiraman .......... | B01D 45/08 55/434 |
| 8,460,416 | B2 | 6/2013 | Hammerschick | |
| 8,601,785 | B2 | 12/2013 | Legare | |
| 9,370,739 | B2 | 6/2016 | Beier et al. | |
| 9,879,578 | B2 * | 1/2018 | Herman ................. | B01D 45/08 |
| 2003/0106292 | A1 * | 6/2003 | Kitano ................... | B01D 45/12 55/396 |
| 2005/0284299 | A1 * | 12/2005 | Lane ....................... | F01D 25/18 96/209 |

(Continued)

*Primary Examiner* — Minh Chau T Pham
(74) *Attorney, Agent, or Firm* — Norton Rose Fulbright Canada LLP (57) ABSTRACT

The described air-oil separation apparatus for an oil system of a gas turbine engine includes an oil tank having an oil impingement surface disposed on a tank bottom proximate an oil tank outlet and a centrifugal air-oil separator mounted within the oil tank. The centrifugal air-oil separator has an oil outlet that feeds an impingement nozzle having an outlet oriented, in operation, to eject an oil jet from the centrifugal air-oil separator to impinge the oil impingement surface at an intersection point spaced apart from the oil tank outlet.

19 Claims, 6 Drawing Sheets

(56) References Cited

U.S. PATENT DOCUMENTS

| | | | |
|---|---|---|---|
| 2006/0283159 A1* | 12/2006 | Scherrer | B01D 45/08 55/434 |
| 2009/0193770 A1* | 8/2009 | Holzmann | B01D 45/06 55/318 |
| 2009/0199826 A1* | 8/2009 | Meinig | B01D 45/08 123/573 |
| 2013/0177490 A1* | 7/2013 | Richardson | B01D 53/56 423/235 |
| 2014/0090421 A1* | 4/2014 | Shock | C03B 5/202 65/134.4 |
| 2014/0105726 A1* | 4/2014 | Lee | F01D 5/188 415/115 |
| 2015/0033697 A1* | 2/2015 | Morrison | F01D 9/023 60/39.83 |
| 2015/0321130 A1 | 11/2015 | Beier et al. | |
| 2016/0138444 A1 | 5/2016 | Prunera-Usach et al. | |

* cited by examiner

AIR-OIL SEPARATION APPARATUS

TECHNICAL FIELD

The application relates generally to gas turbine engines and, more particularly, to fluid systems for such engines.

BACKGROUND

Many components of gas turbine engines require lubrication. Such components may be shaft bearings, gear boxes, and the like. Gas turbine engines typically comprise an oil tank and an oil pump in fluid communication with an oil circuit configured to circulate oil to these components requiring lubrication.

However, such oil circuits are not always leak proof and air that enters the circuit can mix with the oil. The resulting air-oil mixture is thus routed to the components and can affect the lubricating efficiency. A de-aerator is thus typically used to extract any air from the air-oil mixture, before the oil is routed back through the oil circuit. However, existing de-aerators are not always able to extract all the air from the air-oil mixture.

SUMMARY

There is therefore provided an air-oil separation apparatus for an oil system of a gas turbine engine, comprising: an oil tank having an oil impingement surface disposed on a tank bottom proximate an oil tank outlet; and a centrifugal air-oil separator mounted within the oil tank, the centrifugal air-oil separator having a separator air-oil mixture inlet and a separator oil outlet each communicating with a cavity, the separator air-oil mixture inlet disposed tangentially relative to an inner wall of the cavity configured for centrifugal air-oil separation, the separator further including an air outlet communicating with the cavity, the separator oil outlet feeding an impingement nozzle having a nozzle outlet oriented, in operation, to eject an oil jet from the centrifugal air-oil separator to impinge the oil impingement surface at an intersection point spaced apart from the oil tank outlet.

There is also provided an air-oil separation apparatus for an oil system of a gas turbine engine, comprising: an oil tank having an oil impingement surface disposed on a tank bottom proximate an oil tank outlet; and an air-oil separator mounted within the oil tank and comprising a separator air-oil mixture inlet and a separator oil outlet feeding an impingement nozzle having a nozzle outlet oriented, in operation, to eject an oil jet from the air-oil separator to impinge the impingement surface at an intersection point spaced apart from the oil tank outlet.

There is further provided a method of extracting air from an air-oil mixture circulating in an oil circuit of a gas turbine engine, the oil circuit including an oil tank having an oil tank outlet therein, comprising: conducting a first de-aeration step by passing the air-oil mixture through an air-oil separator; and conducting a second de-aeration step by drawing the air-oil mixture out of the air-oil separator, following the first de-aeration step, and ejecting the air-oil mixture therefrom to form an impingement jet, and impinging the air-oil mixture forming the impingement jet against an oil impingement surface of the oil tank proximate the oil tank outlet, the impingement jet contacting an intersection point of the oil impingement surface spaced apart from the oil tank outlet.

BRIEF DESCRIPTION OF THE DRAWINGS

Reference is now made to the accompanying figures in which.

DETAILED DESCRIPTION

Figure 1:
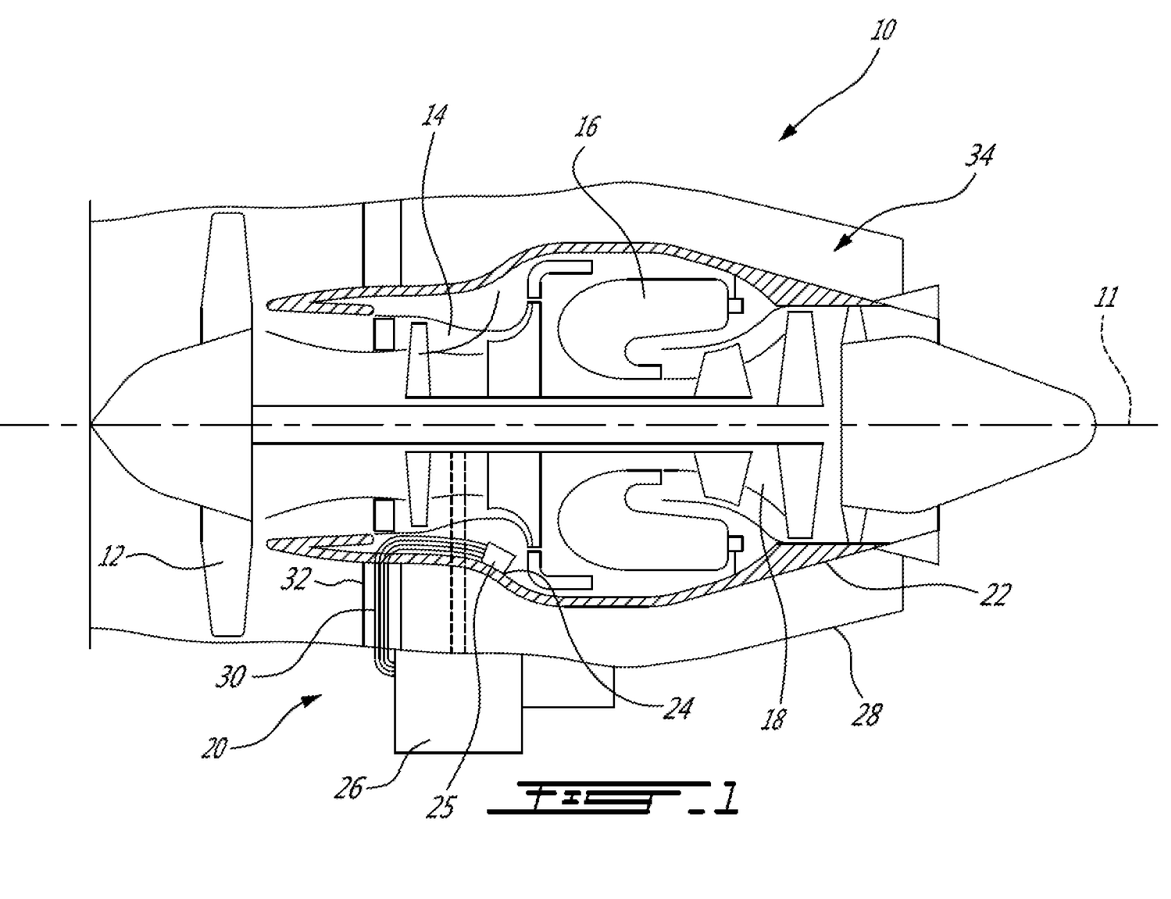
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The engine 10 further comprises one or more fluid systems, such as an oil system 20 that may be disposed adjacent to the engine core case 22. The oil system 20 (which may also be referred to herein as a lubrication system 20, although it is to be understood that the system 20 may also provide cooling purposes in addition to the lubrication of components) includes an oil circuit, an oil pump 25 and an oil tank 24, all in fluid flow communication with each other. The lubrication system 20 may be used to provide oil to components of the gas turbine engine 10 as may be required, for lubrication and/or cooling purposes for example. The lubricated components include bearings disposed between the shaft and a case of the engine 10. The components may also include an accessory gear box 26 mounted adjacent to the fan case 28 of the gas turbine engine 10. The oil circuit of the lubrication system 20 further comprises suitable pipes 30 that interconnect the oil tank 24, the pump 25 and component(s) to be lubricated, including for example the gear box 26. In one embodiment, the pipes 30 are disposed within a hollow portion of a strut 32 disposed in the by-pass duct 34 between the fan case 28 and the engine core case 22.

Figure 2:
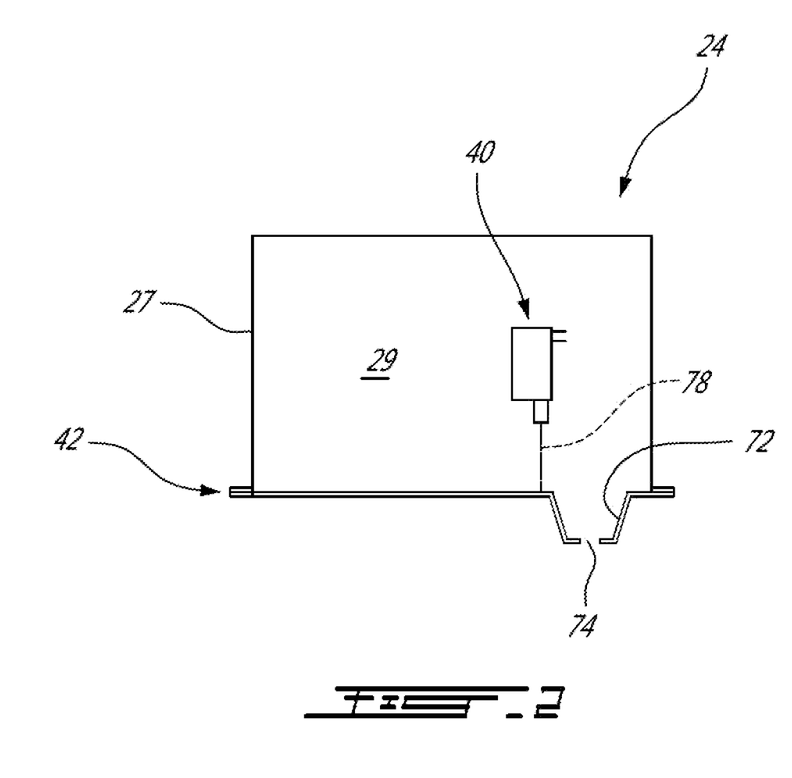
FIG. 2 is a schematic cross-sectional view of an oil tank of the gas turbine engine of FIG. 1, the oil tank having a centrifugal air-oil separator therein.

Referring to FIG. 2, the oil tank 24 of the engine 10 is schematically depicted and includes generally a tank bottom 42 and an upper enclosure 27 which fit together to enclose an oil tank cavity 29 therewithin. Within the oil tank cavity 40 of the oil tank 24 is mounted an air-oil separator 40, as will be described in further detail below. The air-oil separator 40 and the tank 24 within which it is installed, accordingly together form an air-oil separation apparatus as will be described herein.

The outlet of the air-oil separator 40 produces a jet 78 of oil that has undergone a first de-aeration stage in the air-oil separator 40. As will be described below, this oil jet 78 impinges upon an oil impingement surface 76 on the tank bottom 42, thereby undergoing a second de-aeration stage, before the de-aerated oil collects within a cavity 72 in the tank bottom 42 and exits the oil tank 24 via an oil tank outlet 74.

In the oil system 20, the amount of unusable oil corresponds to the minimum volume of oil needed to ensure that the oil pressure is not affected. The minimization of the volume of unusable oil is desirable. If the oil volume decreases below the unusable oil volume, the oil tank outlet 74 will become uncovered and air will be drawn into the system. This phenomenon will cause fluctuations in the oil pressure and a drop in oil pressure may occur as the volume of oil further decreases. As the oil volume drops, the settling time in the tank is reduced. A de-aerator reduces the settling time required to separate the air from the oil. Furthermore, by directing the oil towards the oil tank outlet 74, the required volume of unusable oil is reduced.

Figure 3A:
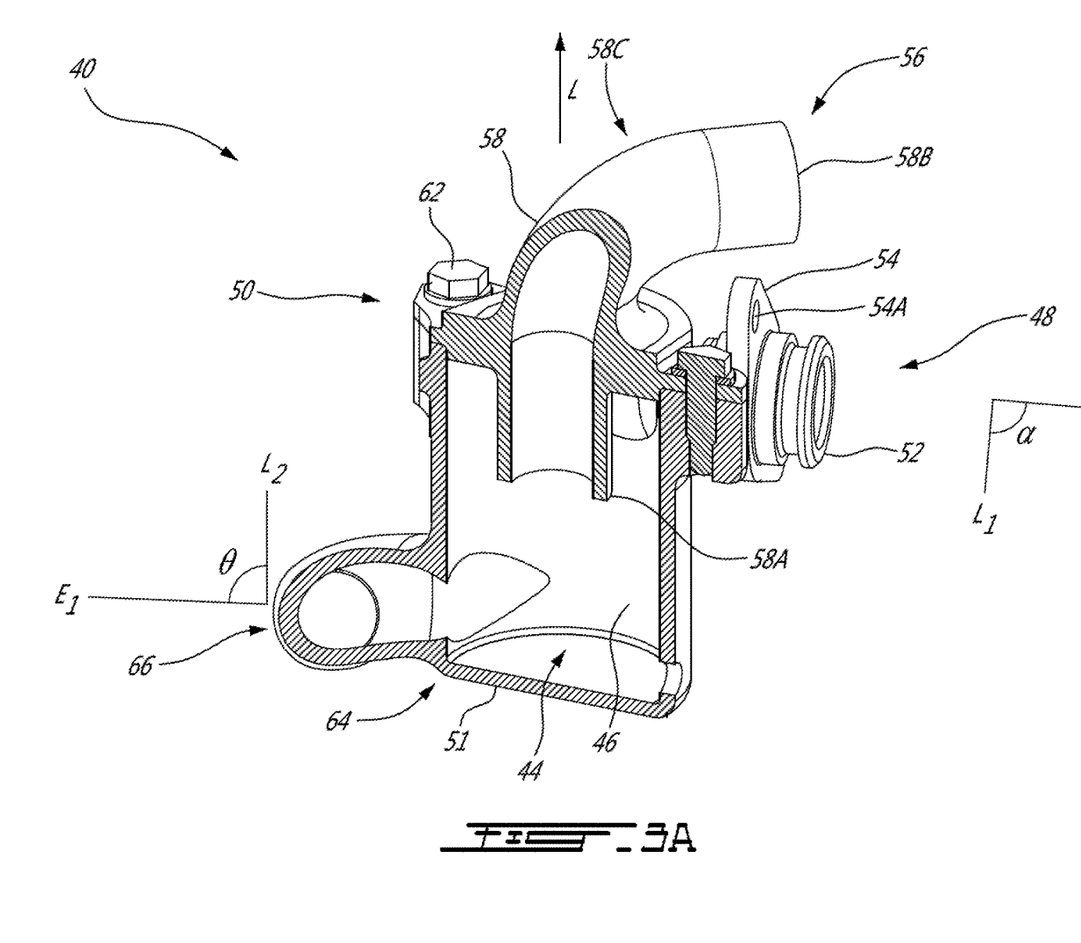
FIG. 3A is a cross-sectional view of the centrifugal air-oil separator from the oil tank of FIG. 2.
Figure 3B:
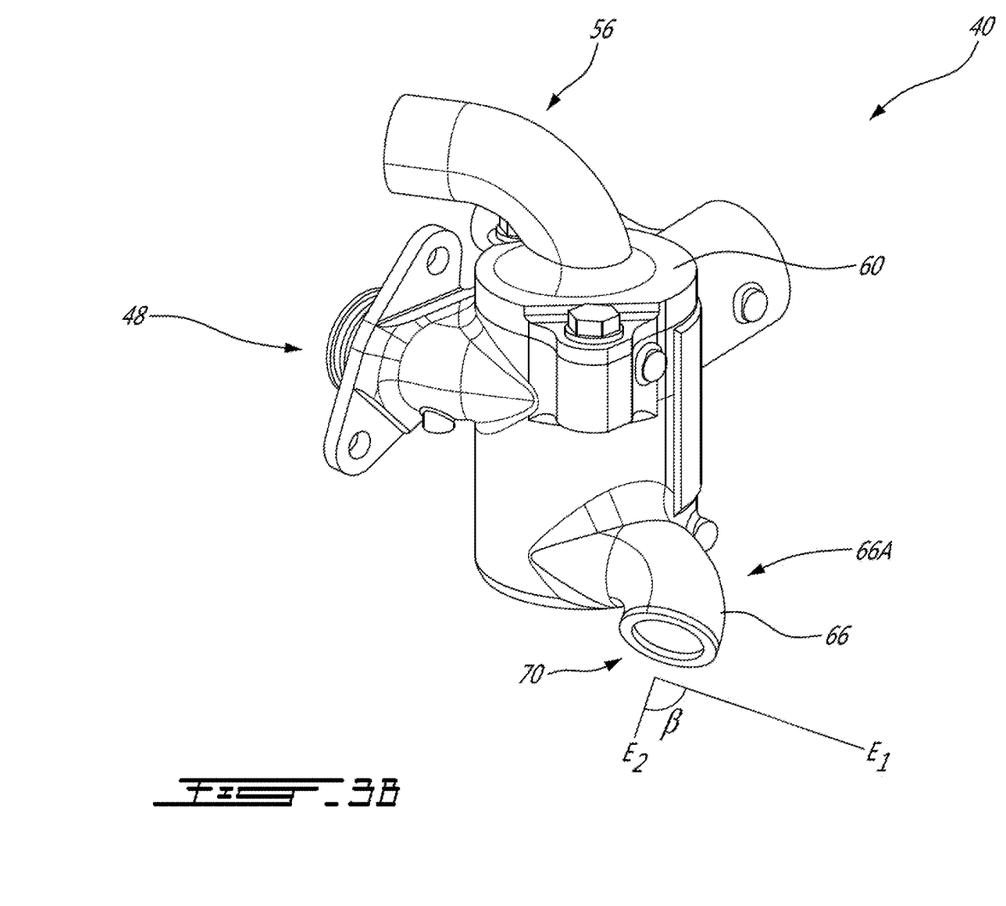
FIG. 3B is a three-dimensional view of the air-oil separator of FIG. 3A.
Figure 4:
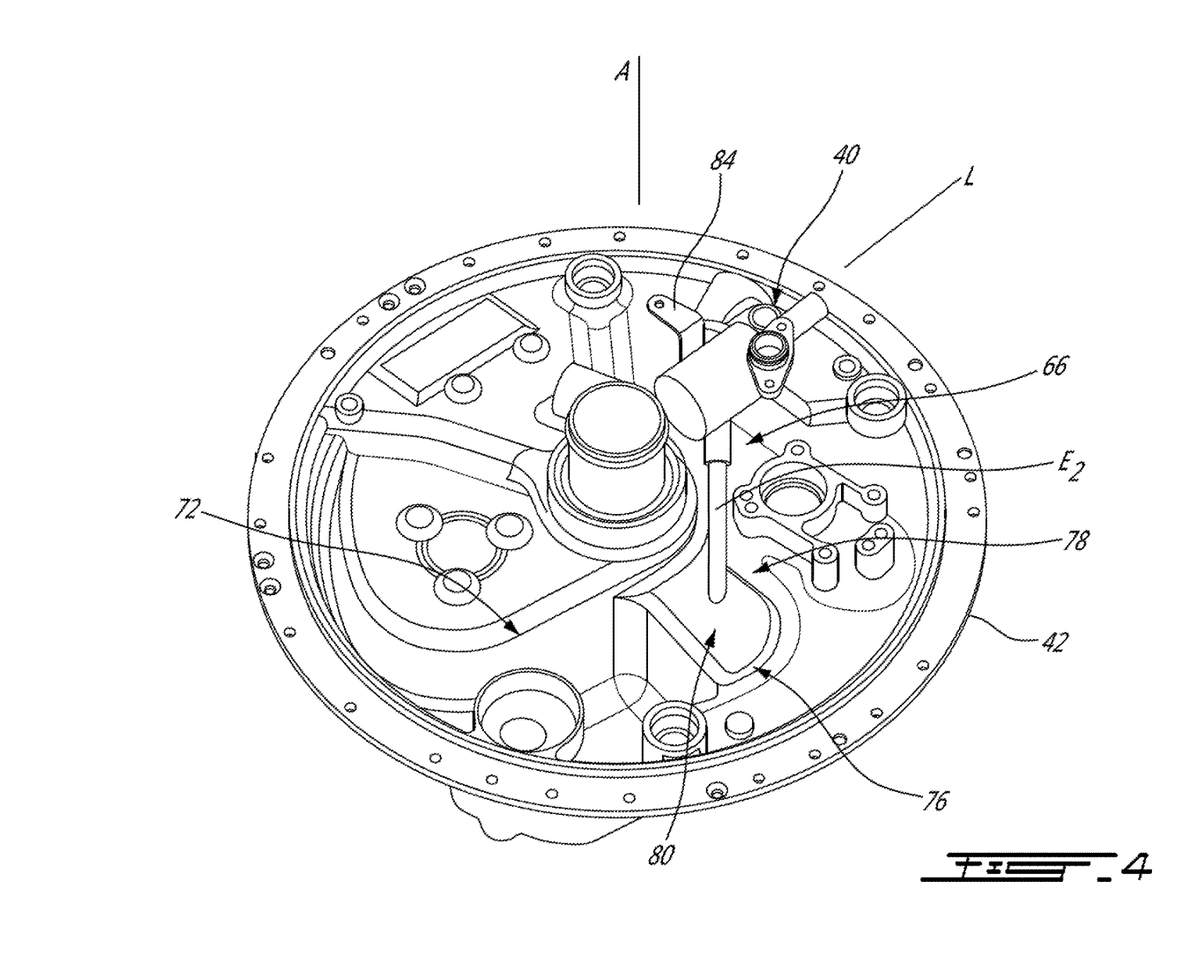
FIG. 4 is a three-dimensional view of a tank bottom of the oil tank of FIG. 2.

Now referring to FIGS. 3A-3B and 4, in the embodiment shown the air-oil separator 40 is a centrifugal air-oil separator and is disposed within the oil tank 24. The separator 40 may be any suitable air-oil separator such as, but not limited to, a centrifugal air-oil separator, a centrifugal breather impeller, and de-aerating filters. For simplicity, however, the air-oil separator 40 may be referred to herein with reference to the depicted embodiment, which is a centrifugal air-oil separator 40.

The centrifugal air-oil separator 40 has a cavity 44 defined by a wall 46. In the embodiment shown, the cavity 44 is a cylindrical cavity. In a particular embodiment, the cavity 44 may be frustoconical. Any shape defining a plurality of circular cross-sections of constant or varying diameters may be used without departing from the scope of the present disclosure. The separator 40 has an inlet 48 for receiving a first air-oil mixture. In the illustrated embodiment, the first air-oil mixture comes from the gear box 26. The inlet 48 is defined through the cylindrical wall 46 of the separator 40. In one embodiment, the inlet 48 is configured such that the first air-oil mixture enters tangentially against the cylindrical wall 46 such that it spins around a longitudinal axis L of the cylindrical cavity 44. The inlet 48 is proximate a top 50 of the centrifugal air-oil separator 40.

In the illustrated embodiment, an angle $\alpha$ between an inlet flow axis I and an axis $L_1$ parallel to the axis L of the cylindrical cavity 44 is 90 degrees. In the illustrated embodiment, the inlet 48 is built integrally with the centrifugal separator 40 and defines a connector end 52 and a flange 54. The connector end 52 and apertures 54A in the flange 54 are used to securely connect the inlet 48 to the pipe 30 circulating a first air-oil mixture from an engine component, such as the gear box 26.

The centrifugal separator 40 further has an air outlet 56. In one embodiment, the air outlet 56 is provided in the form of a pipe 58 extending through a flange 60. The flange 60 acts as the top 50 of the centrifugal separator 40. In the illustrated embodiment, the flange 60 is operatively connected to the centrifugal separator 40 with suitable fasteners 62. In this embodiment, the pipe 58 has an internal portion 58A and an external portion 58B. The internal portion 58A extends axially within the cylindrical cavity 44. The internal portion 58A and the cylindrical cavity 44 are concentric. In a particular embodiment, a ratio of a length of the internal portion 58A relative to the longitudinal axis L to a diameter of the cylindrical cavity is between 1 and 25.

In a particular embodiment, the external portion 58B of the air outlet 56 has an elbow section 58C. The outlet of the pipe 58 is configured to be above the oil level of the tank to allow the extracted air to flow out of the cylindrical cavity 44. The air then flows out of the tank through a breather (not shown).

The centrifugal separator 40 further has an outlet 64 to allow a second air-oil mixture to exit the cylindrical cavity 44. The second air-oil mixture has an air content lower than the first air-oil mixture. Similarly to the inlet 48, the outlet 64 is configured such that the second air-oil mixture exits tangentially relative to the cylindrical wall 46 to maximize the exit velocity. In the illustrated embodiment, the inlet 48 and the outlet 64 are axially offset from one another relative to the longitudinal axis L. The outlet 64 is adjacent to a bottom 51 of the centrifugal separator 40. In this embodiment, the inlet 48 and the outlet 64 are also radially opposed from one another. In the illustrated embodiment, an angle $\theta$ between an exit axis $E_1$ of the outlet 64 and a longitudinal axis $L_2$ parallel to the axis L of the cylindrical cavity 44 is 90 degrees. The outlet 64 may be directed downward such that gravity helps the oil to exit the cavity 44.

The outlet 64 is fluidly connected to an impingement nozzle 66. In the illustrated embodiment, the nozzle 66 is integral with the centrifugal separator 40. In an alternate embodiment, the nozzle 66 may be a separate piece affixed to the centrifugal separator 40 with adequate fasteners. In the illustrated embodiment, the nozzle 66 has an elbow 66A. However, any other suitable shape of the nozzle 66 may be used without departing from the scope of the present disclosure. In an alternate embodiment, the impingement nozzle 66 is integral with the air-oil centrifugal separator 40. The nozzle 66 has an exit flow axis $E_2$ extending centrally through an outlet 70 of the impingement nozzle 66. In the embodiment shown, a cross-sectional area of the impingement nozzle is constant. In an alternate embodiment, a cross-sectional area of the impingement nozzle 66 decreases along the exit flow axis $E_2$ and relative to a flow circulating therein. Such a configuration is used to accelerate the flow before it exits the impingement nozzle 66. The angle $\beta$ between the exit axis $E_1$ of the outlet 64 and the exit flow axis $E_2$ of the impingement nozzle 66 is selected to direct the oil toward the tank bottom 42.

Figure 5:
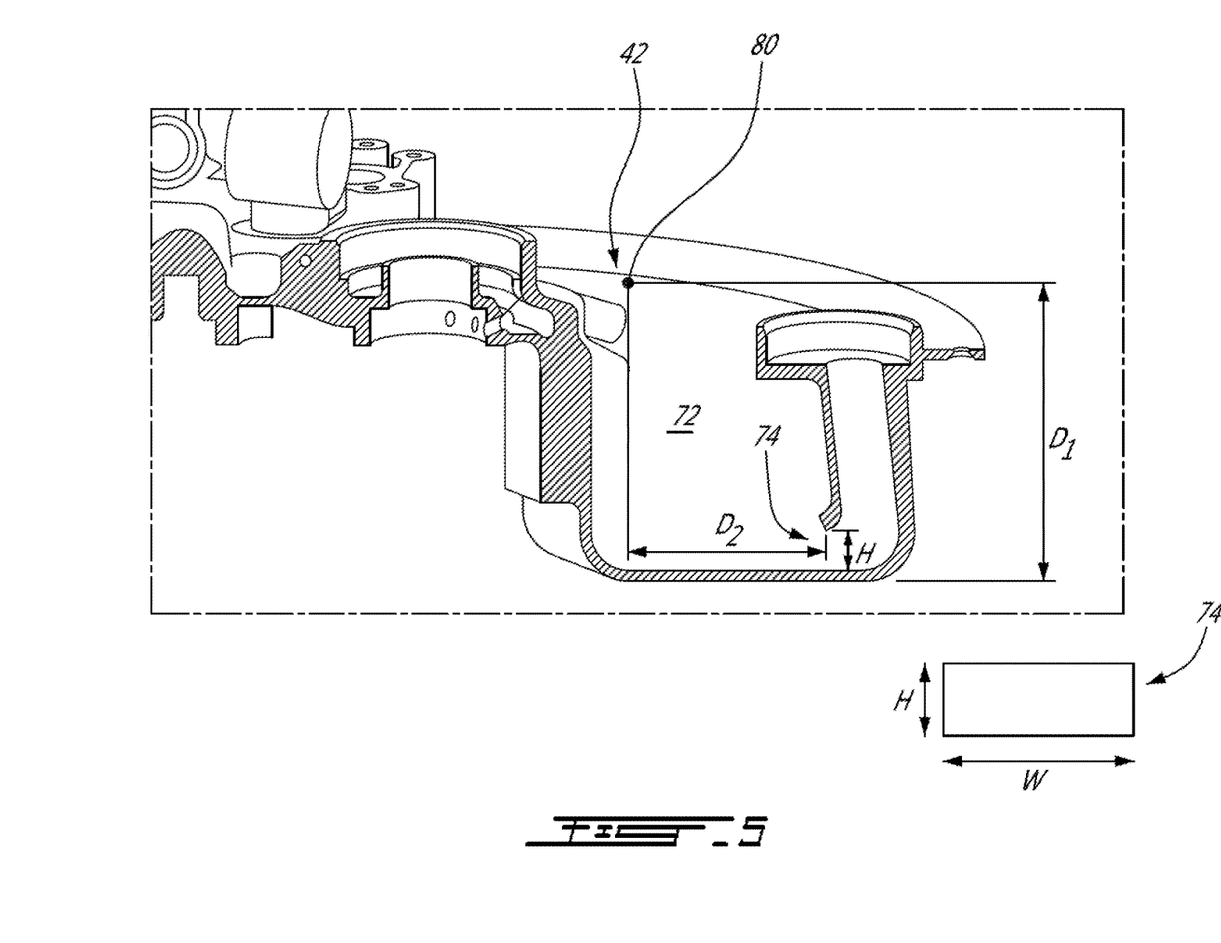
FIG. 5 is a cross-sectional view of a portion of the tank bottom of FIG. 4.

Now referring to FIGS. 4 and 5, the tank bottom 42 of the oil tank 24, which may have a circular shape, forms a receptacle 72 for collecting oil at a low-elevation point of the tank. At the bottom of the receptacle 72 there is disposed an oil outlet 74, which may also serve and/or feed the oil inlet of the oil pump. The oil outlet 74 is disposed at the bottom of the receptacle 72 to ensure that it is always submerged by oil to limit air ingestion by the oil pump.

The air-oil centrifugal separator 40 is disposed in a fixed position relative to the tank bottom 42, and may be fixed to the tank bottom 42 or to the upper enclosure 27 of the oil tank 24. In the embodiment shown, the longitudinal axis L of the centrifugal separator 40 is perpendicular to an axis A of the tank 24. A bracket is used to attach the centrifugal separator 40 to the tank 24.

The tank bottom 42 further has a wall portion, referred to herein below as an oil impingement surface 76. The oil impingement surface 76 is proximate the receptacle 72 and intersects with the exit flow axis $E_2$ of the impingement nozzle 66 such that a jet 78 of the second air-oil mixture impinge the oil impingement surface 76 when it exits the impingement nozzle 66 of the centrifugal separator 40. In the illustrated embodiment, an angle between the exit flow axis $E_2$ and the oil impingement surface 76 is between about 30 and about 85 degrees. This angle is selected to maximize the flow of oil toward the receptacle 72 after the impact with the impingement surface 76.

The oil tank outlet 74 is spaced apart from an intersection point 80 between the oil jet 78 and the oil impingement surface 76 by a predetermined distance. The oil tank outlet 74 defines an opening having a height H and a width W (e.g. a diameter, in the case of a circular opening 74). The predetermined distance may have an axial component, relative to an axis perpendicular to the oil impingement surface 76, and/or a radial component, extending from the intersection point 80 parallel to the oil impingement surface 76.

Consequently, the intersection point 80 is spaced apart from the oil tank outlet 74, either radially or elevationally, or both.

In a particular embodiment, the axial component of the predetermined distance, corresponding to an elevation $D_1$ between the intersection point 80 and the bottom of the oil tank outlet 74, is between one and five times the height H of the oil tank outlet 74. The radial component corresponding to a distance $D_2$ extending radially from the intersection point 80 is between one and five times the width W of the oil tank outlet 74.

Referring to all figures, in operation, the oil is routed toward the oil tank 24 and it enters the inlet 48 of the air-oil centrifugal separator 40. Then, a first de-aeration step is performed by centrifuging the first air-oil mixture around a longitudinal axis L of the cylindrical cavity 44 of the centrifugal separator 40. Then, the extracted air exits through the air outlet 56 defined through the top 50 of the centrifugal separator 40.

The second air-oil mixture then exits the cylindrical cavity 44 via an outlet 64 and enters an impingement nozzle 66 fluidly communicating with the outlet 64. Then, a second de-aeration step is performed when a oil jet 78 exiting the impingement nozzle 66 parallel to an exit flow axis $E_2$ impinges, or impacts, the oil impingement surface 76 of the tank bottom 42. Such impact further releases particles of air trapped in oil of the second air-oil mixture. After the impact with the impingement surface 76, a third air-oil mixture flows in the receptacle 72 and is ready to be sucked by the oil tank outlet 74 to be distributed in the pipes 30 toward components of the engine 10, such as the gear box 26.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An air-oil separation apparatus for an oil system of a gas turbine engine, comprising:
    an oil tank having an oil impingement surface disposed on a tank bottom proximate an oil tank outlet; and
    a centrifugal air-oil separator mounted within the oil tank, the centrifugal air-oil separator having a separator air-oil mixture inlet and a separator oil outlet each communicating with a cavity, the separator air-oil mixture inlet disposed tangentially relative to an inner wall of the cavity configured for centrifugal air-oil separation, the centrifugal air-oil separator further including an air outlet communicating with the cavity, the separator oil outlet feeding an impingement nozzle having a nozzle outlet oriented, in operation, to eject an oil jet from the centrifugal air-oil separator to impinge the oil impingement surface at an intersection point spaced apart from the oil tank outlet.

2. The air-oil separation apparatus according to claim 1, wherein the intersection point is elevated from the oil tank outlet by a distance equal to or less than five times a height of the oil tank outlet.

3. The air-oil separation apparatus according to claim 1, wherein the intersection point is radially spaced from the oil tank outlet by a distance along a direction parallel to the impingement surface equal to or less than five times a width of the oil tank outlet.

4. The air-oil separation apparatus according to claim 1, wherein an angle between the oil jet and the oil impingement surface is between 30 and 85 degrees.

5. The air-oil separation apparatus according to claim 1, wherein the separator air-oil mixture inlet and the separator oil outlet are axially offset from one another.

6. The air-oil separation apparatus according to claim 1, wherein a cross-sectional area of the impingement nozzle decreases toward the nozzle outlet.

7. The air-oil separation apparatus according to claim 1, wherein the air outlet is located above an oil level of the tank.

8. A gas turbine engine comprising an oil system including an oil pump in fluid flow communication with an oil tank outlet of an air-oil separation apparatus according to claim 1.

9. An air-oil separation apparatus for an oil system of a gas turbine engine, comprising:
    an oil tank having an oil impingement surface disposed on a tank bottom proximate an oil tank outlet; and
    an air-oil separator mounted within the oil tank and comprising a separator air-oil mixture inlet and a separator oil outlet feeding an impingement nozzle having a nozzle outlet oriented, in operation, to eject an oil jet from the air-oil separator to impinge the impingement surface at an intersection point spaced apart from the oil tank outlet.

10. The air-oil separation apparatus according to claim 9, wherein the air-oil separator is a centrifugal air-oil separator.

11. The air-oil separation apparatus according to claim 9, wherein the intersection point is spaced apart from the oil tank outlet by a distance equal to or less than five times a height of the oil tank outlet.

12. The air-oil separation apparatus according to claim 11, wherein the intersection point is at least one of radially spaced from the oil tank outlet by said distance in a direction parallel to the impingement surface and elevationally spaced from the oil tank outlet by said distance.

13. A method of extracting air from an air-oil mixture circulating in an oil circuit of a gas turbine engine, the oil circuit including an oil tank having an oil tank outlet therein, comprising:
    conducting a first de-aeration step by passing the air-oil mixture through an air-oil separator; and
    conducting a second de-aeration step by drawing the air-oil mixture out of the air-oil separator, following the first de-aeration step, and ejecting the air-oil mixture therefrom to form an impingement jet, and impinging the air-oil mixture forming the impingement jet against an oil impingement surface of the oil tank proximate the oil tank outlet, the impingement jet contacting an intersection point of the oil impingement surface spaced apart from the oil tank outlet.

14. The method of claim 13, wherein the first de-aeration step comprises the step of centrifuging the air-oil mixture in a cavity of the air-oil separator.

15. The method according to claim 13, wherein the intersection point is elevated from the oil tank outlet by a distance equal to or lower than five times a height of the oil tank outlet.

16. The method according to claim 13, wherein the intersection point is radially spaced from the oil tank outlet by a distance along a direction parallel to the impingement surface equal to or lower than five times a width of the oil tank outlet.

17. The method according to claim 13, before ejecting the air-oil mixture, further comprising the step of accelerating the air-oil mixture through an impingement nozzle in fluid flow communication with an oil outlet of the air-oil separator.

18. The method according to claim 13, wherein the first de-aeration step comprises the step of extracting a portion of air of the air-oil mixture through an air outlet in a top of the air-oil separator.

19. The method according to claim 14, wherein the first de-aeration step comprises the step of receiving the air-oil mixture tangentially against a wall of the cavity of the air-oil separator.

* * * * *